United States Patent
Wong et al.

(10) Patent No.: US 9,389,741 B2
(45) Date of Patent: Jul. 12, 2016

(54) TOUCH PANEL AND A METHOD OF FORMING THE SAME

(71) Applicant: HengHao Technology Co. LTD, Hsinchu County (TW)

(72) Inventors: Ching-Fang Wong, Taoyuan County (TW); Masanori Yuki, Taoyuan County (TW); Shih-Chung Lu, Taoyuan County (TW); Ming-Hung Yang, Taoyuan County (TW)

(73) Assignee: Henghao Technology Co. Ltd., Hukou Township, Hsinchu County (TW)

( * ) Notice: Subject to any disclaimer, the term of this patent is extended or adjusted under 35 U.S.C. 154(b) by 0 days.

(21) Appl. No.: 14/491,734

(22) Filed: Sep. 19, 2014

(65) Prior Publication Data

US 2015/0346861 A1 Dec. 3, 2015

(30) Foreign Application Priority Data

May 30, 2014 (TW) .............................. 103118957 A

(51) Int. Cl.
*G06F 3/045* (2006.01)
*G06F 3/044* (2006.01)

(52) U.S. Cl.
CPC ...... *G06F 3/044* (2013.01); *G06F 2203/04103* (2013.01); *G06F 2203/04107* (2013.01)

(58) Field of Classification Search
CPC .......... G06F 3/044; G06F 2203/04103; G06F 2203/04107
See application file for complete search history.

(56) References Cited

U.S. PATENT DOCUMENTS

| | | | | | |
|---|---|---|---|---|---|
| 8,591,279 | B1 * | 11/2013 | Cok | ...................... | H05K 9/0096 313/582 |
| 2003/0134095 | A1 * | 7/2003 | Bottari | .................... | G06F 3/045 428/209 |
| 2008/0309633 | A1 * | 12/2008 | Hotelling | .............. | G06F 3/0412 345/173 |
| 2009/0266621 | A1 * | 10/2009 | Huang | .................... | G06F 3/044 178/18.01 |
| 2010/0073310 | A1 * | 3/2010 | Liang | ...................... | G06F 3/044 345/173 |
| 2011/0304572 | A1 * | 12/2011 | Wang | ..................... | G06F 3/044 345/173 |
| 2012/0024816 | A1 * | 2/2012 | Huang | .................... | G06F 3/044 216/13 |
| 2012/0044191 | A1 * | 2/2012 | Shin | ........................ | G06F 3/044 345/174 |
| 2012/0069257 | A1 * | 3/2012 | Oh | ....................... | G02F 1/13338 349/42 |
| 2012/0235927 | A1 * | 9/2012 | Ho | .......................... | G06F 3/044 345/173 |
| 2013/0154949 | A1 * | 6/2013 | Jamshidi Roudbari | . | G06F 3/041 345/173 |
| 2013/0307826 | A1 * | 11/2013 | Ma | ........................ | G06F 3/0428 345/175 |
| 2014/0054145 | A1 * | 2/2014 | Chi | ..................... | G06F 3/03547 200/304 |
| 2014/0145971 | A1 * | 5/2014 | Lin | .......................... | G06F 3/044 345/173 |
| 2014/0145999 | A1 * | 5/2014 | Den Boer | ................. | G06F 3/044 345/174 |
| 2014/0204047 | A1 * | 7/2014 | Lai | .......................... | G06F 3/044 345/174 |
| 2014/0307181 | A1 * | 10/2014 | Tang | ..................... | G06F 3/041 349/12 |
| 2015/0103260 | A1 * | 4/2015 | Ho | ........................ | G06F 1/1692 349/12 |

FOREIGN PATENT DOCUMENTS

| | | |
|---|---|---|
| JP | 3182967 U | 4/2013 |
| KR | 1020130018100 | 2/2013 |

* cited by examiner

*Primary Examiner* — Joe H Cheng
(74) *Attorney, Agent, or Firm* — Donald E. Stout; Stout, Uxa & Buyan, LLP

(57) ABSTRACT

A touch panel includes a transparent substrate; an electrode layer formed above a touch area of the transparent substrate; a protective layer formed above a trace area of the transparent substrate; and plural traces formed above the protective layer.

12 Claims, 5 Drawing Sheets

100

200

200

TOUCH PANEL AND A METHOD OF FORMING THE SAME

BACKGROUND OF THE INVENTION

1. Field of the Invention

The present invention generally relates to a touch panel, and more particularly to a touch panel capable of preventing electrically shorting traces by residual electrode material.

2. Description of Related Art

A touch screen is an input/output device that adopts sensing technology and display technology, and has been widely employed in electronic devices such as portable or hand-held electronic devices.

A capacitor-based touch panel is a commonly used touch panel that utilizes capacitive coupling effect to detect touch position. Specifically, capacitance corresponding to the touch position changes and is thus detected, when a finger touches a surface of the touch panel.

FIG. 1 shows a top view of a touch panel 100 having electrodes formed on a centrally-located transparent touch area 11. The touch panel 100 also has non-transparent conductive traces formed on a trace area 12 being located on periphery of the touch panel 100 and surrounding the touch area 11. The traces are used to transmit signals between a controller (not shown) and the electrodes.

Ideally, the electrodes should be formed only on the centrally-located touch area 11 of the touch panel 100. In practice, some conductive material of the electrodes may reside on peripherally-located trace area 12. In case that the residual conductive material is not removed, the residual conductive material may electrically short traces that are formed later on the trace area 12.

A need has thus arisen to propose a novel touch panel that is capable of preventing electrically shorting traces by electrode conductive material resided on the trace area 12.

SUMMARY OF THE INVENTION

In view of the foregoing, it is an object of the embodiment of the present invention to provide a touch panel having a protective layer formed prior the formation of traces such that electrode conductive material resided on a trace area may be blocked.

According to one embodiment, a touch panel includes a transparent substrate, an electrode layer, a protective layer and a plurality of traces. The electrode layer is formed above a touch area of the transparent substrate. The protective layer is formed above a trace area of the transparent substrate. The traces are formed above the protective layer.

DETAILED DESCRIPTION OF THE INVENTION

FIG. 2A to FIG. 4C illustrate a method of forming a touch panel 200 according to one embodiment of the present invention for preventing electrically shorting traces by electrode conductive material resided on a trace area 12. Only components pertinent to the embodiment are depicted, and a person skilled in the pertinent art may modify or add components according to conventional architectures of touch panels.

Figure 1:
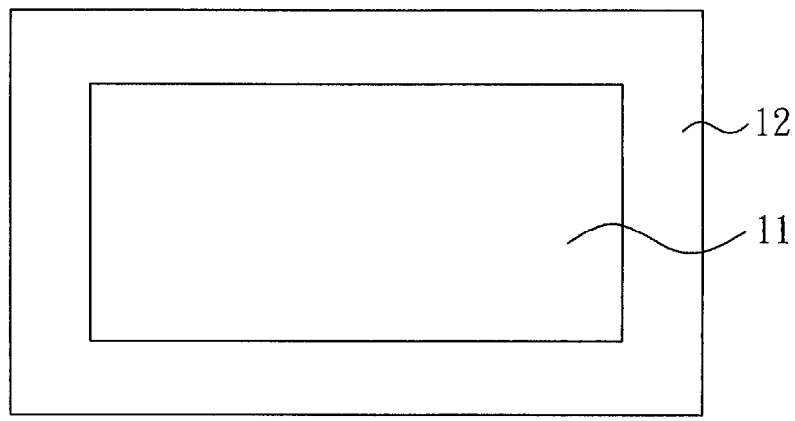
FIG. 1 shows a top view of a touch panel.
Figure 2A:
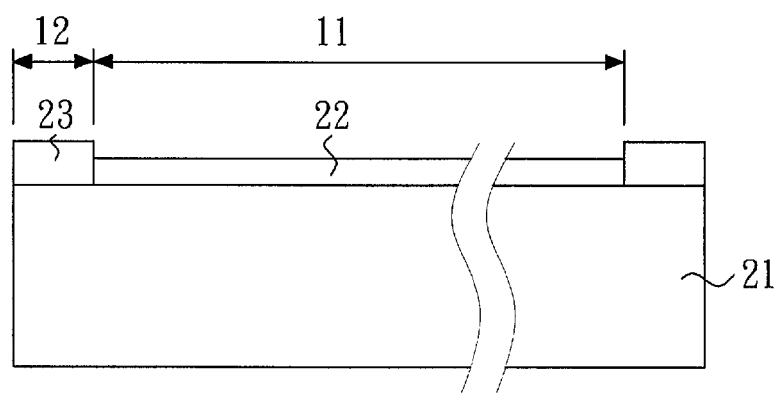
FIG. 2A, FIG. 3A and FIG. 4A show cross-sectional views of a touch panel according to one embodiment of the present invention.
Figure 2B:
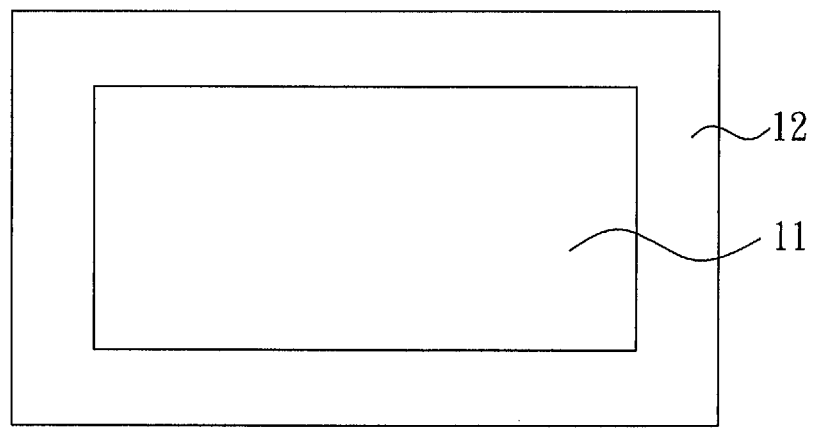
FIG. 2B, FIG. 3B and FIG. 4B show top views of the touch panel.

FIG. 2A shows a cross-sectional view of the touch panel 200, and FIG. 2B shows a top view of the touch panel 200. In the embodiment, the touch panel 200 has a touch area 11 (also known as an active area or a transparent area) being centrally located on the touch panel 200. The touch panel 200 also has a trace area 12 (also known as a peripheral area or a non-transparent area) being peripherally located on the touch panel 200 and surrounding the touch area 11. The shapes and relative positions of the touch area 11 and the trace area 12 of the touch panel 200 shown in FIG. 213 serve only as examples, and a person skilled in the pertinent art may modify shapes and relative positions of the touch area 11 and the trace area 12 according to conventional touch panels.

As shown in FIG. 2A, an electrode layer 22 is formed on a surface of a transparent substrate 21 within the touch area 11. The electrode layer 22 may be made of a transparent material such as indium tin oxide (ITO), indium zinc oxide (IZO), Al-doped ZnO (AZO) or antimony tin oxide (ATO). The transparent substrate 21 may be made of an insulating material such as glass, Polycarbonate (PC), Polyethylene terephthalate (PET), Polymethyl methacrylate (PMMA) or Cyclic olefin copolymer (COC).

In the embodiment, the transparent substrate 21 acts as a cover layer, such as a cover lens. The transparent substrate 21 may have a black matrix (BM) 23 coated on a surface of the trace area 12. In other embodiments, the transparent substrate 21, however, acts as a substrate other than the cover layer, and no black matrix 23 is formed on its surface.

Figure 2C:
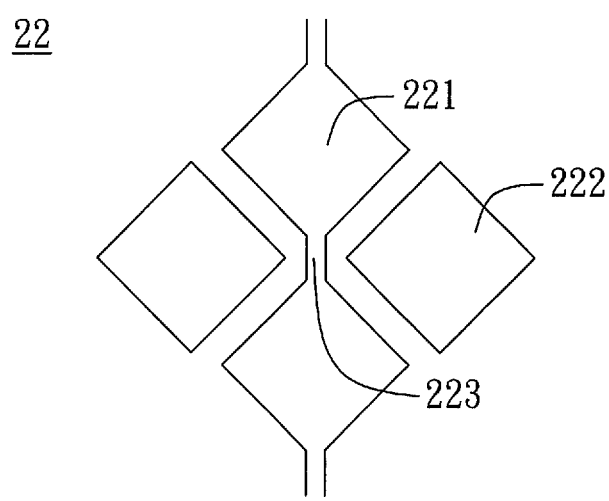
FIG. 2C, FIG. 3C and FIG. 4C show partial enlarged top views of an electrode layer.

FIG. 2C shows a partial enlarged top view of the electrode layer 22, which includes a number of first electrodes 221 that are connected and disposed along a first direction, and a number of second electrodes 222 that are separated from each other and disposed along a second direction. The second direction may be substantially perpendicular to the first direction, and adjacent first electrodes 221 are connected by an electrode connector 223. The shapes, arrangements and connection relationships of the electrodes 221/222 shown in FIG. 2C serve only as examples, and a person skilled in the pertinent art may modify shapes, arrangements and connection relationships of the electrodes 221/222 according to conventional touch panels.

Figure 3A:
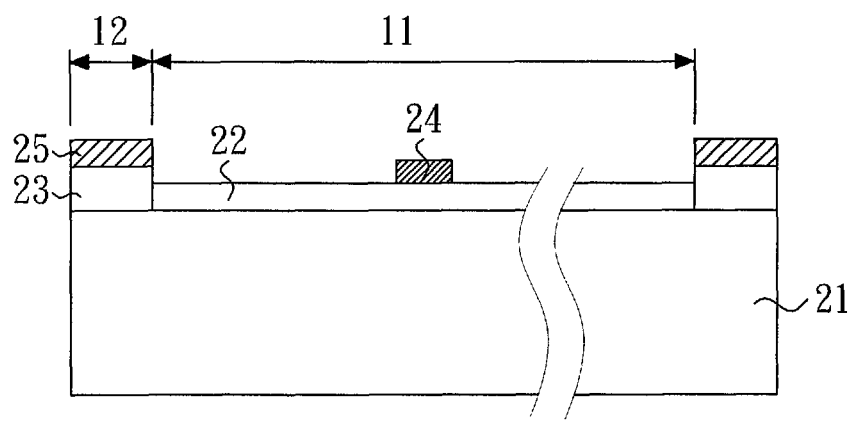
Figure 3B:
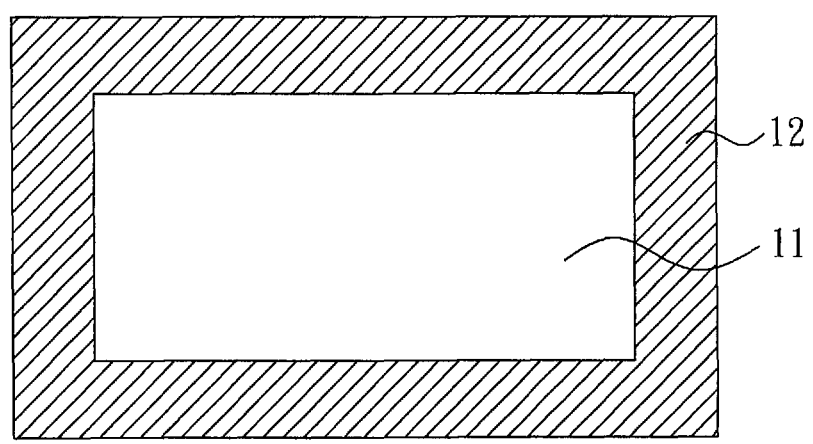
Figure 3C:
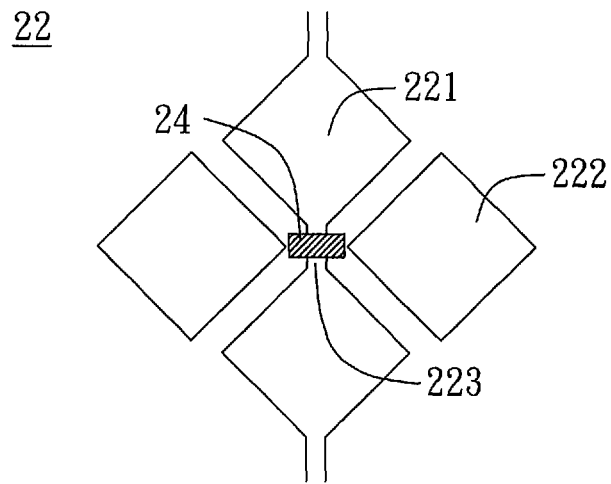

FIG. 3A shows a cross-sectional view of the touch panel 200, FIG. 3B shows a top view of the touch panel 200, and FIG. 3C shows a partial enlarged top view of the electrode layer 22. As discussed above, some electrode material may reside on the trace area 12 (for example, reside on a portion of the BM 23) while forming the electrode layer 22, and the residual electrode material (not shown) may electrically short the traces that are formed later on the trace area 12. Accordingly, according to one aspect of the embodiment, a protective layer 25 is formed on the trace area 12 of the touch panel 200, while, at the same time, an insulating bridge 24 is formed above the electrode connector 223 between adjacent first electrodes 221. In the embodiment, as shown in FIG. 3A, the protective layer 25 is formed on a surface of the BM 23. The protective layer 25 may be made of an insulating material such as organic compound (OC).

Figure 4A:
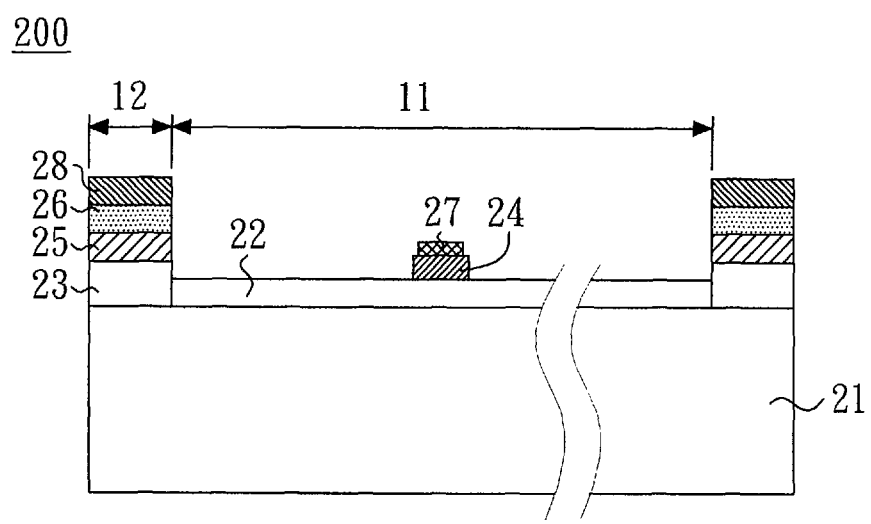
Figure 4B:
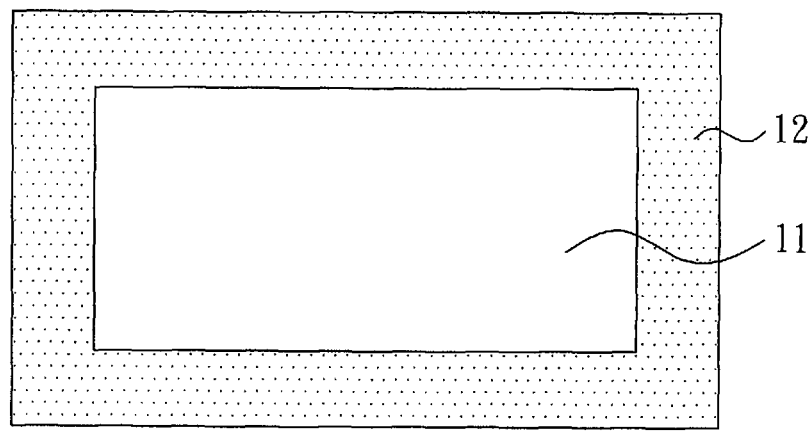
Figure 4C:
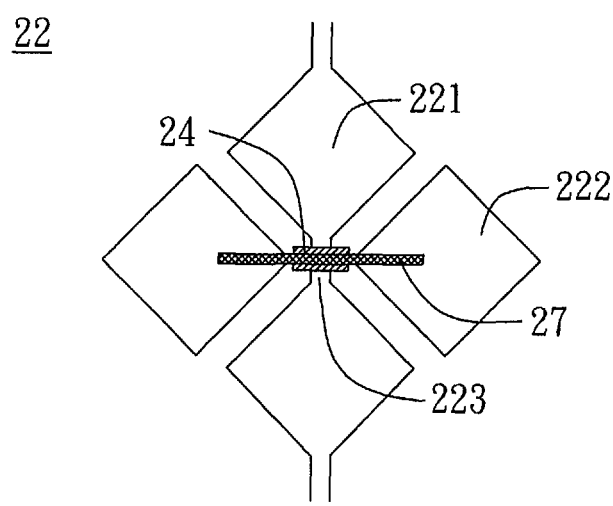

FIG. 4A shows a cross-sectional view of the touch panel 200, FIG. 4B shows a top view of the touch panel 200, and FIG. 4C shows a partial enlarged top view of the electrode layer 22. As shown in FIG. 4A and FIG. 4B, a number of traces 26, such as metal traces, are formed above the protective layer 25. While forming the traces 26, conductive bridge 27 may be formed, at the same time, above the insulating bridge 24 in the touch area for electrically connecting adjacent second electrodes 222. As the traces 26 are formed above the protective layer 25, the protective layer 25 may effectively block the residual electrode conductive material underneath the protective layer 25. As a result, the bottom of the traces 26 may be prevented from being electrically shorted due to residual electrode conductive material. An insulating layer 28 may be further formed above the traces 26 to prevent the top of the traces 26 from being electrically shorted. The insulating layer 28 may be made of a conventional insulating material.

Although specific embodiments have been illustrated and described, it will be appreciated by those skilled in the art that various modifications may be made without departing from the scope of the present invention, which is intended to be limited solely by the appended claims.

What is claimed is:

1. A touch panel, comprising:
    a transparent substrate;
    an electrode layer formed above a touch area of the transparent substrate;
    a protective layer formed above a trace area of the transparent substrate;
    a plurality of traces formed above the protective layer; and
    at least one black matrix disposed on a surface of the transparent substrate within the trace area, the protective layer being disposed above the at least one black matrix.

2. The touch panel of claim 1, wherein the protective layer comprises an insulating material.

3. The touch panel of claim 2, wherein the insulating material comprises organic compound (OC).

4. The touch panel of claim 1, wherein the electrode layer comprises:
    a plurality of first electrodes disposed along a first direction, adjacent first electrodes being connected by an electrode connector; and
    a plurality of second electrodes disposed along a second direction, the second electrodes being separated from each other and adjacent second electrodes being connected by a conductive bridge.

5. The touch panel of claim 4, further comprising an insulating bridge disposed between the electrode connector and the conductive bridge.

6. The touch panel of claim 1, further comprising an insulating layer disposed above the traces.

7. A method of forming a touch panel, comprising:
    providing a transparent substrate;
    forming at least one black matrix on a surface of the transparent substrate within a trace area;
    forming an electrode layer above a touch area of the transparent substrate;
    forming a protective layer above the trace area of the transparent substrate, the protective layer being formed above the at least one black matrix; and
    forming a plurality of traces above the protective layer.

8. The method of claim 7, wherein the protective layer comprises an insulating material.

9. The method of claim 8, wherein the insulating material comprises organic compound (OC).

10. The method of claim 7, wherein the electrode layer comprises:
    a plurality of first electrodes disposed along a first direction, adjacent first electrodes being connected by an electrode connector; and
    a plurality of second electrodes disposed along a second direction, the second electrodes being separated from each other and adjacent second electrodes being connected by a conductive bridge.

11. The method of claim 10, further comprising a step of forming an insulating bridge between the electrode connector and the conductive bridge while forming the protective layer.

12. The method of claim 7, further comprising a step of forming an insulating layer above the traces.

* * * * *